(12) United States Patent
Dane et al.

(10) Patent No.: US 11,453,947 B2
(45) Date of Patent: Sep. 27, 2022

(54) AQUEOUS ACIDIC COMPOSITION FOR TREATING METAL SURFACES, TREATING METHOD USING THIS COMPOSITION AND USE OF TREATED METAL SURFACE

(71) Applicant: TATA STEEL IJMUIDEN B.V., Velsen-Noord (NL)

(72) Inventors: Chiel Matthias Dane, Heerhugowaard (NL); Richard Johannes Van Der Net, Dordrecht (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 221 days.

(21) Appl. No.: 16/499,003

(22) PCT Filed: Mar. 27, 2018

(86) PCT No.: PCT/EP2018/057829
§ 371 (c)(1),
(2) Date: Sep. 27, 2019

(87) PCT Pub. No.: WO2018/178108
PCT Pub. Date: Oct. 4, 2018

(65) Prior Publication Data
US 2020/0048775 A1    Feb. 13, 2020

(30) Foreign Application Priority Data
Mar. 30, 2017  (EP) ..................... 17163981

(51) Int. Cl.
*C23C 22/53* (2006.01)
*B05D 3/10* (2006.01)
(Continued)

(52) U.S. Cl.
CPC .............. *C23C 22/53* (2013.01); *B05D 3/102* (2013.01); *B05D 7/14* (2013.01);
(Continued)

(58) Field of Classification Search
CPC ......... C23C 22/53; C23C 22/34; B05D 3/102; B05D 7/14; C10M 177/00;
(Continued)

(56) References Cited

U.S. PATENT DOCUMENTS

| 2004/0009300 A1 | 1/2004 | Shimakura et al. |
| 2004/0062873 A1 | 4/2004 | Jung et al. |

(Continued)

FOREIGN PATENT DOCUMENTS

| CN | 101705484 A | 5/2010 |
| EP | 0317684 A1 | 5/1989 |

(Continued)

OTHER PUBLICATIONS

"Terminology of polymers containing ionisable or ionic groups and of polymers containing ions", Pure Appl. Chem., (2006), vol. 78, No. 11, pp. 2067-2074.

(Continued)

*Primary Examiner* — Vishal V Vasisth
(74) *Attorney, Agent, or Firm* — Vorys, Sater, Seymour and Pease LLP

(57) ABSTRACT

An aqueous acidic composition for treating metal surfaces, the composition including the following components:
a) at least one water soluble or water dispersable anionic polyelectrolyte;
b) at least one organofunctional silane including one or more reactive functional groups selected from the group including amino, mercapto, methacryloxy, epoxy and vinyl;
c) at least one water dispersible solid wax
wherein the weight ratio between components a:b is in the range of 1:2-4:1, based on dry matter; the weight ratio between components (a+b):c is in the range of 1:3-3:1, based on dry matter, and wherein components a and b may be present—at least partially—as their graft reaction product.

(Continued)

Another aspect is a treating method using this composition and use of the thus treated metal surface.

33 Claims, 1 Drawing Sheet

(51) Int. Cl.
| | |
|---|---|
| *B05D 7/14* | (2006.01) |
| *C10M 101/02* | (2006.01) |
| *C10M 107/50* | (2006.01) |
| *C10M 111/04* | (2006.01) |
| *C10M 177/00* | (2006.01) |
| *C23C 22/34* | (2006.01) |
| *C10N 50/08* | (2006.01) |

(52) U.S. Cl.
CPC ...... *C10M 101/025* (2013.01); *C10M 107/50* (2013.01); *C10M 111/04* (2013.01); *C10M 177/00* (2013.01); *C23C 22/34* (2013.01); *C10M 2207/2805* (2013.01); *C10M 2229/0545* (2013.01); *C10N 2050/08* (2013.01)

(58) Field of Classification Search
CPC ............ C10M 101/025; C10M 111/04; C10M 107/50; C10M 2207/2805; C10M 2229/0545; C10N 2040/20
See application file for complete search history.

(56) References Cited

U.S. PATENT DOCUMENTS

| | | |
|---|---|---|
| 2008/0308192 A1 | 12/2008 | Bello et al. |
| 2010/0029814 A1* | 2/2010 | Inbe ..................... C23C 22/68 |
| | | 524/186 |
| 2010/0035055 A1 | 2/2010 | Okai et al. |
| 2015/0036127 A1 | 12/2015 | Domes et al. |

FOREIGN PATENT DOCUMENTS

| | | |
|---|---|---|
| EP | 1433827 A1 | 6/2004 |
| EP | 1988189 A1 | 11/2008 |
| EP | 3059331 A1 | 8/2016 |
| JP | 3006455 A | 2/2000 |
| WO | 0164356 A1 | 9/2001 |
| WO | 2015039762 A1 | 3/2015 |
| WO | 2015197430 A1 | 12/2015 |

OTHER PUBLICATIONS

International Search Report and Written Opinion dated Jun. 13, 2018 for PCT/EP2018/057829 to TATA STEEL IJMUIDEN B.V. filed Mar. 27, 2018.

* cited by examiner

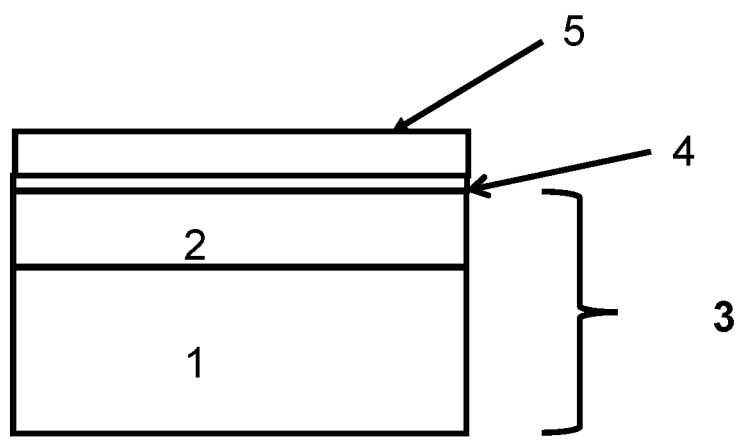

AQUEOUS ACIDIC COMPOSITION FOR TREATING METAL SURFACES, TREATING METHOD USING THIS COMPOSITION AND USE OF TREATED METAL SURFACE

CROSS-REFERENCE TO RELATED APPLICATIONS

This is a § 371 National Stage Application of International Application No. PCT/EP2018/057829 filed on Mar. 27, 2018, claiming the priority of European Patent Application No. 17163981.8 filed on Mar. 30, 2017.

The present invention relates to an aqueous composition for treating metal surfaces, a method of treating metal surfaces using this aqueous composition and use of a treated metal surface, in particular in the automotive industry.

In a first aspect the invention is directed to an aqueous composition for treating metal surfaces, in particular coated metal surfaces, for example zinc or zinc alloy coated steel strip, such as hot dip galvanized (HDG) steel strip.

Electrolytically galvanized (EG) steel has been used extensively in the automotive technical field, in particular for the vehicle body, as well as in industry in general. Typically after the steel has been galvanized, the resulting steel product, whether strip or sheet, is phosphatized in view of improving its forming properties, also known as pre-phosphatizing. An additional lubricant, such as a prelube, drylube or hotmelt, is also applied thereafter. This type of zinc layer, additional phosphate layers and lubricants are beneficial for superior formability and preventing galling and pollution of the forming tools.

Continuously hot-dip zinc (alloy) coated (HDG) steel is becoming more important in automotive industry as the surface quality is improving. However in critical forming operations zinc from the HDG steel tends to accumulate on the forming tools resulting in unacceptable surface defects also known as galling. Contrary to pre-phosphatized EG steel, wear and friction in forming operations are increasing on HDG steel despite the use of lubricants like drawing oils and hot melts.

In order to improve the tribological properties of hot dip zinc-coated steel, it is known to apply additional layers, just before a corrosion inhibiting lubricant is applied. Most of these additional treatments are based on "dried-in-place" technology. Traditional metal surface treatment chemistry, like phosphatizing, requires post rinsing to remove excess of the applied chemicals. Dried-in-place chemistries allow for the applied treatment compositions to be dried on the metal substrate without rinsing between depositing and drying step.

Various approaches and proposals for dealing with one or more of the problems encountered in using HDG steel sheet in the production of (external) automotive components like formability, (spot) welding, adhesive bonding and painting have been disclosed over the past decades. One of the problems the technologists have is that "what is good for the press is bad for the bond".

Tri-cation (Ni, Mn, Zn) band phosphating processes requiring rinsing have been developed. Further, a no-rinse non-crystalline band phosphating process was developed. These so called pre-phosphatation treatments are used to improve corrosion resistance, lubricity and adhesion. In addition to the complex non-economic processing that is involved in band-phosphatizing, the resulting phosphate layers suffer from poor welding performance. They are hard to remove rendering subsequent standard phosphatizing steps difficult.

EP1988189A1 discloses a continuous process of coating HDG steel sheet, which process comprises a step of supplying a surface pre-conditioning agent comprising zinc phosphate particles to a surface of the HDG sheet, an intermediate pre-drying step and a step of supplying a treatment agent comprising also zinc phosphate.

US2008/308192A1 discloses the use of an aqueous alkaline treatment solution containing sulphate ions with a concentration of not less than 0.01 mol/l for treating the surface of a galvanized steel sheet having the purpose of reducing degradation of the coating of the galvanized steel sheet during the operation of forming the sheet, as well as the purpose of improving the temporary corrosion protection thereof.

Similar processes involving the application of alkaline mixtures of sulphates, hydroxides and carbonates are disclosed in WO2015039762A1 and WO2015/197430A1.

JP3006455 discloses a lubricatively treated metal material with a film, which has a thickness of 0.8-4 μm. This film is formed by applying one or more water-soluble and/or water-dispersible acrylic resins having a glass transition temperature of 10-85° C. and a treating agent containing 0.2-5 wt. % silane coupling agent and 0.5-10 wt. % metal soap to the solid content of the resin, and then drying.

EP317684 discloses a multifunctional coating composition for zinc coated steel, which composition comprises organic copolymers of the group acrylic, vinyl-acrylic, styrene-acrylic, nitrile-acrylic having free carboxylic groups and certain lubricity additives in view of lowering the friction coefficient, and polyvalent cations and conductive particles in view of facilitating weldability.

WO 01/64356 discloses a metal article that is coated with a coating composition composed of a silane coupling agent component, a polymer component having a specific chemical structure according to General Formula 1 as represented in this WO publication, and a wax component.

EP3059331 discloses a metal surface treatment agent comprising a zirconium compound, an aqueous epoxy resin derived from a specific carboxyl group polymer and having an acid value of 5-50 mg/g, and a hydroxyl carboxylic acid.

Some of the above proposed metal surface treatments, in particular treatment of HDG for use in automotive (body) production, have been actually commercialized. Nevertheless, the ongoing developments in the automotive industry put higher requirements to the starting steel sheets in view of processability.

In a typical production process car manufactures receive the galvanized steel, which may have been treated e.g. by one of the above treatments and if applicable, oiled for temporary corrosion protection during storage and shipment, as well as for formability, as a strip on coils from the steel manufacturers. Blanks are cut from the steel strip and the blanks are formed into the desired shape. Subsequently various shaped parts are adhesively bonded or (spot) welded together into an assembly such as a car body (body in white). After an optional degreasing step, the assembly is typically subjected to a phosphatizing treatment and then painted, usually in an E coat process.

The various steps in this production chain put different requirements on the coated e.g. hot dip galvanized steel as received, in particular for manufacturing external automotive (body) parts. It is highly desired that the relevant properties of HDG steel are comparable to those of lubricated EG steel. Those properties include for example, press performance and forming behaviour, e.g. according to VDA 230-213; durable adhesive bonding, e.g. according to SEP1220-6; no negative effect on weldability; possibility of standard alkaline cleaning allowing phosphatizing and/or alternative pre-treatments (see e.g. VDA 230-213); no negative influence on paintability, in particular E coat. Advantageously, a treatment of HDG steel should be an efficient and effective process, that can be incorporated in a typical production line of such steel. Waste disposal should be minimal in view of environmental considerations and legislation.

None of the treatment technologies discussed above fulfil the combination of these requirements completely and in a satisfying technical and technological manner.

An object of the present invention is to provide a metal treatment composition for improvement of the tribology and adhesion aspects of the metal surface being treated.

A further object of the present invention is to provide a metal treatment composition, that has a combination of tribological (formability), adhesion, weldability, wettability and paintability properties that suit the present automotive (body) production process, or an alternative to the above known metal treatment compositions.

Another object is to provide a metal treatment composition that is multifunctional and can be used satisfactorily where just one or a few of the above properties are required in view of the intended end use of the treated metal surface, such as domestic appliances, building materials and the like.

Yet another object is to provide a metal surface treatment process, in particular for HDG steel for the automotive industry, which can be incorporated in a continuous line of manufacturing the metal surface.

In a first aspect the invention provides an aqueous acidic composition for treatment of a metal surface, such as a coated metal surface, in particular a zinc or zinc alloy coated metal surface, advantageously HDG steel strip, as defined in claim 1.

The aqueous acidic composition according to the invention comprises three main constituents, that is to say one or more anionic polyelectrolytes (component a), one or more organofunctional silanes (component b) and one or more solid, water dispersible waxes (component c). The weight ratio of components a:b is in the range of 1:2-4:1, based on dry matter; and the weight ratio of components (a+b):c is in the range of 1:3-3:1, based on dry matter.

In the present application the expression "polyelectrolyte" is used according to the IUPAC definition in Pure Appl. Chem., Vol 78, No. 11, pp 2067-2074, 2006 "Terminology of polymers containing ionisable or ionic groups and of polymers containing ions" (IUPAC Recommendations 2006). The anionic polyelectrolyte is a macromolecule in which a substantial portion of the constituting units have ionisable or ionic groups of anionic nature or both. Examples of these groups are carboxylic acid, sulphonic acid, phosphoric acid, phosphonic acid and methacrylic acid.

Thus typical examples of water soluble anionic polyelectrolytes are polyacrylic acid, polysulphonic acid, phosphorylated polyvinylalcohol, polymethacrylic acid, polymaleic acid, polyvinylphosphonic acid, and polyvinylsulphonic acid. Other typical examples of the water soluble anionic polyelectrolyte include copolymers and terpolymers, such as copolymers of methylvinylether and maleic acid, copolymers of methylvinylether and acrylic acid, copolymers of vinylphosphonic acid and acrylic acid, copolymers of maleic acid and acrylic acid, copolymers of ethylene-acrylic acid and sulphonic acid. The molecular weight Mw is typically in the range of 5000-500.000 g/mol. The polyelectrolyte is water dispersible, preferably water soluble.

Advantageously the acid value of the anionic polyelectrolyte is at least 200 mg KOH/g, such as 300 or more in view of adhesion properties. Adhesion is mainly related to the number of anionic groups of the anionic polyelectrolyte in the composition according to the invention. Preferably the acid value is at least 400, more preferably at least 600 and most preferably at least 700 mg KOH/g.

The polyelectrolyte is the film forming component in the aqueous acidic composition according to the invention. Advantageously in a ready to be applied (non-concentrated) composition, that is to say in a concentration for the intended final application, this component a is present in amount of 0.6-40 g/L, preferably 1.6-20 g/L.

The organofunctional silane is a silicon compound having a reactive organic group. Preferably the organic group is selected from amino, mercapto, methacryloxy, epoxy and vinyl. It promotes the adhesion between the metal substrate and the polyelectrolyte.

Preferably the organofunctional silane is present in its hydrolysed and partially condensed form, more preferably it is essentially free from alcohol. Upon contact with water the organofunctional silanes will hydrolyse (forming silanol groups and releasing alcohol) and partly condensate, thereby forming silane oligomers.

In a non-concentrated composition at application concentration according to the invention the at least one organofunctional silane is present in an amount of 0.3-40 g/L, preferably 0.8-20 g/L. Typical examples of organofunctional silanes (in hydrolysed and partially hydrolysed and condensed form) comprise vinyl triethoxy silane, 3-mercaptopropyl trimethoxy silane, N-(2-aminoethyl) 3-aminopropyl methy ldimethoxy silane, N-(aminoethyl) 3-aminopropyl trimethoxy silane, 3-amino-propyltriethoxy silane, 3-methacryloxypropyl-methyldimethoxy silane, 3-methacryloxypropyl trimethoxy silane, 2-(3,4 epoxycyclohexyl)ethyltrimethoxy silane, 3-glycidoxypropyl triethoxy silane, 3-glycidoxypropyl trimethoxy silane, 3-glycidoxy-propyl methyldimethoxy silane.

Once applied and dried the components (a+b) are present on the treated metal surface in the range of 1-200 mg/m$^2$ of the metal surface, preferably in the range of 4-70 mg/m$^2$. If the layer weight is lower than 1 mg/m$^2$, the adhesion (improvement) and durability of the low friction behaviour may be insufficient, while higher layer weights (>200 mg/m$^2$) can affect weldability and cleanability.

In this respect it is noted that the components a and b may also be provided as the graft reaction product of reacting the anionic polyelectrolyte and the organofunctional silane. It is most likely that in the composition as applied according to the invention the anionic groups of the polyelectrolyte have reacted at least to some extend with the organofunctional groups of the hydrolyzed and condensed silane component.

Examples of waxes (component c) comprise one or more water dispersible waxes, like emulsions of (modified) polyethylene wax, oxidized HDPE wax, polypropylene wax, montan (ester) wax, carnauba wax, amide wax, paraffin wax, oxidized polyolefin waxes, high melt Fischer-Tropsch wax, ethylene acrylic acid wax. The wax component is preferably present in the range of 1.5-30 g/L, more preferably 4-15 g/L. Advantageously the melting temperature of the wax component is in the range of 60-150° C., preferably in the range of 75-120° C. The applied layer weight (based on dry solids) of component c is preferably in the range of 3-60 mg/m$^2$, more preferably in the range of 6-30 mg/m$^2$. If the wax component is present in a lower proportion in the applied layer, the forming properties are insufficient, while at higher layer weights the bonding of adhesive and/or paint is adversely affected. Additionally weldability will be reduced.

The ratio of components (a+b):c is in the range of 1:3-3:1, based on dry matter.

For the treatment of HDG steel for manufacturing automotive body parts therefrom preferably the ratio of the anionic polyelectrolyte (component a) to the wax (component c) is less than 1.

The wax component, if applied as a thin layer, reduces the friction coefficient, which has a positive effect on the forming properties of the metal surface, like a metal sheet. The additional application of lubricants like (drawing) oils might improve the forming properties. However, the wax and lubricant, if any, reduce the adhesive bonding properties, as well as paintability including direct post painting. According to the invention the particulate solids of the wax component are incorporated in the film of polyelectrolyte and organofunctional silane, thereby at least levelling the reduction of the adhesive/paint bonding properties. The forming properties are also maintained during a longer period of time, because the wax particles are bonded to the metal substrate in the film forming matrix of polyelectrolyte and silane compound.

Advantageously the aqueous treatment composition according to the invention is free from inorganic compound particles for adhesion promotion. Although the presence of such solid inorganic particles could potentially offer an improvement of the bonding behaviour of the metal surface thus treated, the forming (tribological) properties would deteriorate substantially.

The aqueous composition according to the invention is acidic. Preferably the pH is in the range of 1.2-6, more preferably 1.6-3.5. If the pH is below the lower limit, overetching of the metal surface may occur. If the pH is higher, than the stability of the composition may leave something to be desired, and insufficient adhesion of the acid groups of the polyelectrolyte to the metal substrate is likely to occur.

Optionally, the aqueous acidic composition according to the invention comprises additives. In view of adhesion to the metal substrate advantageously the composition further comprises at least one fluoride compound, advantageously a water soluble fluoride compound, preferably a fluoacid having at least 4 F atoms and one or more elements selected from the group consisting of Si, Ti, Zr and Al, such as ammonium hexa fluo zirconium acid, hexa fluor zirconium acid and hexa fluor titanic acid. The preferred total amount of F— anions, if present, is in the range of 0-3 g/L, most preferably 0.1-1.5 g/L. The fluoride ions have the function of etching the metal surface that is covered with a passive oxide skin, resulting in improved adhesion. Advantageously the total amount of fluorides, if present, in the applied layer is up to 6 mg/m$^2$.

Other polyvalent cations that might be present include $Zn^{2+}$, $Mn^{2+}$, $Mg^{2+}$, $Sr^{2+}$ and $Ca^{2+}$. For an individual cation species this is typically in the range of 0-1 g/L, preferably 0-0.5 g/L. It is desired to maintain the total amount of all cations in the application composition at a level of less than 2 g/L. Depending upon the application method during contact of the composition with the metal surface Zn, Mg, AL and Fe may dissolve, e.g. in an immersion bath, resulting in an increase of the amount of these cations in the treatment composition in the immersion bath.

Phosphates may be added to provide a sufficient amount of tracer element P allowing to determine the layer weight by means of XRF. They also contribute to the relevant properties described above and can be used to adjust pH. Examples of suitable phosphate compounds comprise zinc bis hydrogen phosphate, ammonium hydrogen phosphate, chromium tri phosphate, phosphoric acid, aluminium ortho phosphate. If present typical amounts are in the range of 0-40 g/L, advantageously 0-20 g/L. Typically the layer weight of phosphate ($PO_4^{3-}$), if any, is in the range up to 80 mg/m$^2$. High phosphate deposits will cause poor welding performance and hard to remove zinc phosphates in subsequent cleaning procedures.

Complexing/chelating agents may be present for stabilizing the aqueous composition, in particular for preventing deposition of cations with the phosphates, if any, and the polyelectrolytes. Hydroxy carboxylic acids, phosphonates and their salts are examples thereof. Other examples include ATMP, DTPMP, HEDP, PBTC, HPAA, gluconic acid, glycolic acid, lactic acid, citric acid. The concentration of the complexing agent is in the range of 0-30 g/L, preferably 0-15 g/L. Advantageously the amount of the optional complexing agent in the applied layer is in the range of 0-80 mg/m$^2$. In these amounts the complexing agents also improve the ease of removability of the layer in alkaline cleaning procedures.

Total solids of the above components is in the range of 2.4-160 g/L, while a range of 6.4-92.5 g/L is preferred.

Surfactants may be added to the basic composition for improving wettability, foaming and flow properties.

The metal surface to be surface treated by the composition according to the invention is not particularly limited, although the full combination of beneficial properties of the composition is used to a large extent upon treating coated metal surfaces, such as zinc or zinc alloy coated steel, in particular HDG steel strip or sheet. Other examples of metal substrates to which the composition according to the invention can be applied comprise aluminium, cold rolled steel (CRS), electrogalvanized steel (EG), AluSi (AS), hot dip zinc-alloy coated steels such as: Mg, Al (ZM), Zinc Iron (GA), Galfan (ZA), Galvalume (AZ) steel, as well as metal surfaces having a coating applied by CVD and/or PVD.

In a second aspect the invention provides a method of treating a metal surface, such as a coated metal surface, in particular a zinc or zinc alloy coated steel strip, more particularly HDG steel, comprising a step of applying the aqueous acidic composition according to the invention as outlined above on the metal surface.

The method of contacting the metal surface to be treated with the aqueous acidic treatment composition according to the invention is not limited. Significant application methods include immersion (squeeze), spray (squeeze), spray disc, flood (squeeze), roll coating (ChemCoater) and kiss coater.

Advantageously the method is performed in a continuous manner on an advancing metal substrate, more preferably in the hot dip galvanizing line of metal strip. During application of the composition the temperature of the metal surface is usually in the range of 20–50° C. Rinsing of the treated metal surface is superfluous. Typically drying of the applied composition is performed in place. In order to avoid disadvantageous side effects on the treated metal surface the period of time that the wet film of the applied composition is present on the metal surface is limited, preferably between 1 msec and 10 sec.

Preferably the method comprises a step of drying the applied aqueous acidic composition, preferably at elevated temperature, more preferably at a Peak Metal Temperature in the range of 35–80° C. Drying can be performed using heating by means of gas heating, induction heating, infra-red or near infra-red heating Advantageously the resulting coating weights after drying are:

Total coating weight: 0.001 g/m$^2$-1.5 g/m$^2$, preferably 0.004-0.2 g/m$^2$;
Polyelectrolyte: 0.3-320 mg/m$^2$, preferably 0.8-80 mg/m$^2$;
Silane: 0.15-320 mg/m$^2$, preferably 0.4-80 mg/m$^2$;
Wax: 0.75-240 mg/m$^2$, preferably in the range of 3-60 mg/m$^2$;
Fluoride: if any, up to 6 mg/m$^2$;
Phosphate: if any, up to 80 mg/m$^2$;
Complexing agent if any, up to 80 mg/m$^2$;
Cations as described above if any, up to 10 mg/m$^2$;
Surfactant: if any, up to 1 mg/m$^2$.

In an embodiment after drying a further step of applying a lubricant to the treated metal surface is carried out, preferably in a coating weight of 0.2 to 3.0 g/m$^2$. Advantageously the lubricant is also applied in the mill, before coiling.

In a third aspect the invention provides for the use of a metal surface, in particular a coated metal surface, such as a zinc of zinc alloy coated steel sheet treated according to the invention in the production of an automotive component. Such use comprises typically at least one or more steps of subjecting a blank metal sheet to forming, such as hot forming, joining shaped metal sheets together e.g. by adhesive bonding, (spot) welding shaped metal sheets together, (alkaline) degreasing, phosphatizing and painting like applying an E coat.

Benefits of this invention include
improved formability (lower friction forces and thus lower press forces required)
less galling/tool pollution during repeated forming operations
reduction of the amount of lubricant applied on the metal
improved adhesive bonding on Zn coated and ZnMg alloy coated metal substrates
durable adhesive bonding compared to only oiled metal
easy removal of lubricant
economical application process
low chemical consumption per m$^2$
very limited waste of chemicals
no rinse water necessary
welding operations can be performed in sufficiently wide operating windows without electrode sticking
treated metal sheet can be used in standard car body phosphating process followed by E coat step
painting following cleaning when oiled
direct painting without cleaning when not oiled The invention is illustrated by the following examples.

EXAMPLES

Polyelectrolyte Component a1

A commercial grade random copolymer of polyvinylphosphonic-co-acrylic acid solution (based on 30 mol % vinylphosponic acid and 70 mol % acrylic acid and a solid content of 38 wt. %). The acid value is 769 mg KOH/g.

The acid value was determined by dissolving a predetermined amount of the polyelectrolyte sample in a suitable solvent, i.c. water because this polyelectrolyte is water soluble. Then the aqueous solution thus obtained was titrated with a solution of potassium hydroxide having a known concentration. Phenolphtalein was used as color indicator.

Polyelectrolyte Component a2

A water-soluble co-polymer, which is the reaction product from vinyl ether and maleic anhydride with a molecular weight Mw of 220.000 g/mol. The anhydride was converted into the acid form by hydrolysis. In order to dissolve and hydrolyse the polymer was dispersed in warm water. The polyelectrolyte solution was diluted with water to obtain a solid weight concentration of 21 wt. %. The acid value of component a2 is 852 mg KOH/g.

Organofunctional Silane Component b

Two commercial available organofunctional silane oligomers, a partially hydrolysed and condensed epoxy silane wt. 10% and a fully hydrolyzed aminoalkylsilane 30 wt. %, were mixed for 1 hour with 8 wt. % phosphoric acid. Then water was added 52 wt. % and the solution was kept for 8 hours at 50° C. The final silane solution had a solid content of 31 wt. %. As hardly no alcohols are released during hydrolysis there is no need for an additional distillation step to make the product VOC free.

Graft Reaction Product Ab

Polyelektrolyte component a2 was blended with 3-glycidoxy propyl trimethoxy silane in a dry weight ratio of 2:1. Hydrolysis and reaction were carried out during 3 hours at 50° C. The resulting product after vacuum distillation to remove alcohol was diluted with water to a solid weight concentration of 17.5 wt. %. This graft reaction product has an acid value of 396 mg KOH/g.

Wax Component c

Non-ionic stabilized water-dispersed montan-ester wax (solids 30 wt. %)

Example Ex1

3 Wt. % of the organofunctional silane component b and 2.4 wt. % polyelectrolyte component a1 were added to demineralised water. The final mixture contained 9.1 g/L of the polyelectrolyte (dry solid weight) and 9.3 g/L of the silane. (dry solid weight). Finally the wax component c was added in a concentration of 2.4 wt. %, amounting to 7.2 g/L of wax. Total Solids: 25.6 g/L; pH=2.1 and 1.8 g/L phosphates (derived from the organofunctional silane component b). Weight ratio polyelectrolyte:silane=1:1.3, polyelectrolyte:wax=1:0.8 and ((polyelectrolyte+silane):wax=1:0.4.

Example Ex2

To 2.4 wt. % of the above graft reaction product ab (resulting in 2.8 g/L of polyelectrolyt), 11 g/L of HEDP (60 wt. %) as a complexing agent was added, before 19 g/L hexafluorotitanium acid (50 wt. %) and 6 g/L aluminium orthophosphate (48 wt. %) were added. Finally 2.4 wt. % wax component c was added (7.2 g/L of wax). Example 2: ratio A:B=1:0.5 and ratio (A+B):C=1:1.7 Weight ratio polyelectrolyte:silane=1:0.5, polyelectrolyte:wax=1:1.7 and ((polyelectrolyte+silane):wax=1:0.6.

Comparative Example CEx1

A metal treatment aqueous solution was prepared that contained zinc bis-hydrogenphosphate (8.6 g/L of phosphate and 3 g/L of zinc) and 24 g/L of wax component c. Total solids 18.8 g/L. pH=2.1.

Comparative Example CEx2

This solution contained 46 g/L of aluminium ortho phosphate (dry solids), an emulsion acrylate co-polymer 8.6 g/L (dry solids) and 24 g/L of wax component c. Total solids 61.8 g/L; pH=1.9. The acid value of the acrylate co-polymer is 4 mg KOH/g.

Comparative Example CEx3

A metal treatment aqueous solution of polyelectrolyte component a2 (30 g/L) and wax component c (24 g/L) was prepared. Total solids 13.5 g/L; pH=2.2. Weight ratio polyelectrolyte:wax=1:1.1.

Comparative Example CEx4

This composition contained silane component b (200 g/L) and wax component c (24 g/L). Total solids 69 g/L; pH=3.

Comparative Example CEx5

A composition containing 8.6 g/L emulsion acrylate co-polymer (acid value: =4 mg KOH/g), 4.3 g/L silane and 0.2 g/L of wax component c 7.2 g/was prepared.

The above aqueous metal treatment compositions as summarized in Table 1 were applied to HDG steel (grade BH180) having a thickness of 0.6 mm using a ChemCoater. The wet film had a coating weight of 2 g/m² before drying. The samples were dried at a PMT of 70° C.

Table 1 summarizes the compositions.

TABLE 1

Compositions of examples (Ex) and comparative examples (CEx)

| Sample | Polymer/ Polyelectrolyte | Silane | Grafted product | Wax | Fluoride | Phosphate | Complexing agent |
|---|---|---|---|---|---|---|---|
| CEx1 | | | | c | | Zn phosphate | |
| CEx2 | Acrylic copolymer | | | c | | Al phosphate | |
| CEx3 | a2 | | | c | | | |
| CEx4 | | b | | c | | | |
| CEx5 | Acrylic copolymer | b | | c | | | |
| Ex1 | a1 | b | | c | | | |
| Ex2 | | | ab | c | $TiF_6$ | Al phosphate | HEDP |

Each of the samples was subjected to various tests including:

Lubricity

Linear friction test: Galling

Force 5 kN, 20 mm/min, test length 55 mm, tools Ra=0.4

Visual inspection after 6 strokes

CoF=coefficient of friction before and after 6 strokes

After application of the compositions of Table 1, the thus treated samples were loaded with 1 g/m² per side prelube oil PL61 (Zeller+Gmelin).

Adhesive Bonding

Adhesive bonding tests: lapshear with and without ageing (VDA 621-415) according to SEP 1220-6.

After application of the compositions of table 1, the thus treated samples were loaded with 3 g/m² per side prelube oil PL 3802-39 S (Fuchs) and tested with two commercially available structural adhesives, i.e. Betamate (Dow) and M91

Failure mode: adhesive/cohesive, cohesive is the desired failure mechanism.

Weldabiliy

Spot welding performance was tested according to SEP 1220/2.

Material was welded to itself, as well as in combination with HDG and EG coated materials. Standard welding parameters as specified in SEP1220-2 were used. Tests that have been performed:

Welding current range window:

Electrode life test

Additionally the electrode sticking behaviour was assessed.

Testing of Removability (Suitable for Standard E Coat Process)

For subsequent trouble free process steps like phosphatizing, painting and similar or alternative steps, the forming auxiliaries (metal treatment composition/lubricant) should be removed, as much as possible in the alkaline cleaning step.

VDA 230-213 (ch.5.10) water break test

XRF measurement of coating weight (removal)

Table 2 summarizes the result in qualitative way. For comparison test results of phosphatized EG, commercially available inorganic treated NIT on GI and T-treated (Zn phosphate) on GA and GI reference are also incorporated.

After the alkaline cleaning step a standard phosphatizing procedure was followed (activation and phosphatizing). The performance of the thus treated samples was studied visually (using a microscope) and homogeneity, coverage, crystal size and thickness of the phosphate layers were evaluated. If no abnormalities were determined in the phosphate layer compared to the GI reference then the rating "pass" is given, meaning that the thus treated surface is suitable for E coat evaluated by observing the crystal size using a microscope, the coverage and thickness of the phosphate layer.

TABLE 2

Test results

| Sample | Formability (<0.15 = pass) CoF(no. of strokes) CoF (1) | | Adhesive bonding (cohesive (=pass)/adhesive(=fail)) Structural adhesive | | Welding (>1.2 kA = pass) | | | Removability composition and lubricant [%] (40-70% = moderate; 70%- 90% = good; 100% excellent) | Phosphatibility (suitable for E coat) |
|---|---|---|---|---|---|---|---|---|---|
| | CoF (1) | Cof (6) | Betamate (Dow) | M91 | Welding current range [kA] | Electrode life test [no. of welds] | remark | | |
| EG Phosphate | 0.14 | 0.1 | cohesive | cohesive | | | | 100 | pass |
| NIT | 0.1 | 0.16 | cohesive | cohesive | | | | 80 | pass |
| T treat | 0.13 | 0.12 | adhesive | adhesive | 2 | 600 | sticking | Not determined | NA |
| GI reference | 0.1 | 0.25 | cohesive | cohesive | 3 | >1000 | | 100 | pass |
| CEx1 | 0.09 | 0.17 | adhesive | adhesive | 3 | >1000 | | 70 | pass |
| CEx2 | 0.1 | 0.08 | adhesive | adhesive | 1.8 | | sticking | 50 | fail |
| CEx3 | 0.1 | 0.19 | cohesive | adhesive | 3 | | | 100 | pass |
| CEx4 | 0.1 | 0.11 | adhesive | adhesive | 3 | | | 100 | pass |
| CEx5 | 0.1 | 0.08 | adhesive | adhesive | 1.8 | | sticking | 50 | fail |
| Ex1 | 0.09 | 0.11 | cohesive | cohesive | | | | 40 | fail |
| Ex2 | 0.09 | 0.13 | cohesive | cohesive | 2.3 | >1000 | | 90 | pass |

The above results indicate that Example 1 according to the invention has a combination of properties regarding formability, adhesion bonding and welding on HDG steel similar to phosphate EG steel, and better than the commercially available treatments and comparative examples. Example 2 shows the best overall performance regarding all tested properties.

The below table 3 provides further test data regarding adhesive bonding properties for structural adhesives Betamate and M91 tested according to SEP 1220-6 on GI (zinc coated) and MZ (magnesium zinc coated) steel samples after degreasing, treated with 2 mL/m$^2$ of Cex1, Ex1 and Ex2 and oiled with 3 g/m$^2$ PL3802-395, respectively.

TABLE 3

| | GI Betamate 1480V203G shear strength [N] | M91 shear strength [N] | MZ Betamate 1480V203G shear strength [N] | M91 shear strength [N] |
|---|---|---|---|---|
| Degreased reference | 5000 | 4550 | 4780 | 4550 |
| CEx 1 | 4520 | 4200 | 4550 | 4150 |
| Ex 1 | 4800 | 4750 | 4780 | 4550 |
| Ex 2 | 4950 | 4500 | 4850 | 4450 |

The above test results show that the compositions (Ex1 and Ex2) according to the invention provide a similar or better bonding performance than the degreased (untreated) reference for both types of steel and both types of adhesives, while in all these conditions the comparable example CEx1 performs less than the reference.

The below Table 4 provides further adhesion test data for zinc magnesium alloy coated steel HX460LAD+Z120 (1.5 mm), (indicated as MZ in the table below) with and without post-treatment with the composition according to Ex2 using different adhesives compared to the GI reference DX56MZ140 (1.5 mm). The composition of Ex2 was applied at 2 g/m$^2$, cured 60 min at 190° C. and oiled with PL61 (3 g/m$^2$). 100% cohesive failure is considered excellent.

TABLE 4

| | Lap Shear test % cohesive failure mode | | | Peel test % cohesive failure mode | | |
|---|---|---|---|---|---|---|
| Adhesives | Teroson RB 5194 GB | Teroson RB 5191 GB | Betamate 1485 S | Teroson RB 3233AA25 | Betaguard KP75 | Teroson RB 1248LV25 |
| GI reference | 100 | 100 | 100 | 75 | 100 | 80 |
| MZ | 100 | 100 | 80 | 60 | 100 | 70 |
| MZ plus Ex2 | 100 | 100 | 100 | 100 | 100 | 95 |

FIG. 1 is a diagrammatical view of an embodiment of a steel product treated according to the invention, wherein the reference numerals refer to:

1=steel strip or sheet;
2=Zn or Zn alloy coating;
3=HDG steel strip or sheet;
4=treatment composition according to the invention;
5=additional lubricant (oil).

It has been shown that a metal surface treatment composition and treatment method according to the invention provide a balanced improvement of the tribology and adhesion properties allowing welding operations, if required. Therefore the metal surfaces treated according to the invention, in particular zinc or zinc alloy coated surfaces thus treated, are attractive for use in manufacturing processes of articles, such as automotive (body) parts, that involve forming, joining and painting operations.

The invention claimed is:

1. An aqueous acidic composition for treating metal surfaces, said composition comprising the following components:
   (a) at least one water soluble or water dispersable anionic polyelectrolyte;
   (b) at least one organofunctional silane comprising one or more reactive functional groups selected from the group comprising amino, mercapto, methacryloxy, epoxy and vinyl;
   (c) at least one water dispersible solid wax;
   wherein the weight ratio between components a:b is in the range of 1:2-4:1, based on dry matter; the weight ratio between components (a+b):c is in the range of 1:3-3:1, based on dry matter,
   wherein the at least one anionic polyelectrolyte has an acid value of at least 400 mg KOH/g, wherein the aqueous acidic composition is free from inorganic compound particles.

2. The aqueous acidic composition according to claim 1, wherein the at least one anionic polyelectrolyte has an acid value of at least 600 mg KOH/g.

3. The aqueous acidic composition according to claim 1, wherein the at least one anionic polyelectrolyte has an acid value of at least 700 mg KOH/g.

4. The aqueous acidic composition according to claim 1, wherein the at least one anionic polyelectrolyte is present in an amount of 0.6-40 g/L.

5. The aqueous acidic composition according to claim 4, wherein the at least one anionic polyelectrolyte is present in an amount of 1.6-20 g/L.

6. The aqueous acidic composition according to claim 1, wherein the at least one organofunctional silane is present in an amount of 0.3-40 g/L.

7. The aqueous acidic composition according to claim 6, wherein the at least one organofunctional silane is present in an amount of 0.8-20 g/L.

8. The aqueous acidic composition according to claim 1, wherein the at least one water dispersable wax is present in an amount of 1.5-30 g/L.

9. The aqueous acidic composition according to claim 8, wherein the at least one water dispersable wax is present in an amount of 4-15 g/L.

10. The aqueous acidic composition according to claim 1, wherein the ratio of components a:c is less than 1.

11. The aqueous acidic composition according to claim 1 having a pH in the range of 1.2-6.

12. The aqueous acidic composition according to claim 11 having a pH in the range of 1.6-3.5.

13. The aqueous acidic composition according to claim 1, wherein the composition further comprises at least one fluoride compound.

14. The aqueous acidic composition according claim 13, wherein the at least one fluoride compound comprises a fluoacid having at least 4 F atoms and one or more elements selected from the group consisting of Si, Ti, Zr and Al.

15. The aqueous acidic composition according to claim 13, wherein the at least one fluoride compound is present in a total amount of F- anions 0.1-1.5 g/L.

16. The aqueous acidic composition according to claim 1, wherein the composition further comprises one or more complexing agents and/or surfactants.

17. A method of treating a metal surface, comprising a step of applying the aqueous acidic composition according to claim 1 on the metal surface.

18. The method according to claim 17, wherein the metal surface is a zinc or zinc alloy coated steel strip.

19. The method according to claim 17, further comprising a step of drying the applied aqueous acidic composition, at elevated temperature.

20. The aqueous acidic composition according to claim 1, wherein the water soluble anionic polyelectrolytes are selected from polyacrylic acid, polysulphonic acid, phosphorylated polyvinylalcohol, polymethacrylic acid, polymaleic acid, polyvinylphosphonic acid, and polyvinylsulphonic acid, copolymers of methylvinylether and maleic acid, copolymers of methylvinylether and acrylic acid, copolymers of vinylphosphonic acid and acrylic acid, copolymers of maleic acid and acrylic acid, copolymers of ethylene-acrylic acid and sulphonic acid.

21. The method according to claim 20, wherein the step of drying the applied aqueous acidic composition is performed at a Peak Metal Temperature in the range of 35-80° C.

22. The method according to claim 17, wherein the coating weight (dry solids) is in the range of 0.001 g/m2-1.5 g/m2.

23. The method according to claim 22, wherein the coating weight (dry solids) is in the range of 0.004-0.2 g/m2.

24. The method according to claim 17, wherein the coating weight (dry solids) is
   component a) polyelectrolyte: 0.3-320 mg/m2;
   component b) silane: 0.15-320 mg/m2;
   component c) wax: 0.75-240 mg/m2.

25. The method according to claim 24, wherein the coating weight (dry solids) is
   component a) polyelectrolyte: 0.8-80 mg/m2;
   component b) silane: 0.4-80 mg/m2;
   component c) wax: 3-60 mg/m2.

26. The method according to claim 17, further comprising the step of applying a lubricant.

27. The method according to claim 26, wherein the lubricant is applied in a coating weight of 0.2 to 3.0 g/m2.

28. A method of use of a coated metal surface, in particular a zinc or zinc alloy coated steel sheet, treated according to claim 17 in the production of an automotive component comprising at least one step selected from the group of forming, joining and painting.

29. The method of use according to claim 28, wherein the coated metal surface is a zinc or zinc alloy coated steel sheet.

30. The method of use according to claim 28 at least comprising the steps of forming, joining and painting.

31. The aqueous acidic composition according claim 1, wherein the at least one water dispersable wax is present in an amount of 4-15 g/L.

32. The method according to claim 17, further comprising a step of drying the applied aqueous acidic composition, at a Peak Metal Temperature in the range of 35-80° C.

33. The aqueous acidic composition according to claim 1, wherein components (a) and (b) are at least partially present as their graft reaction product.

* * * * *